United States Patent
Zhang et al.

(10) Patent No.: US 8,760,491 B2
(45) Date of Patent: Jun. 24, 2014

(54) METHOD AND SYSTEM FOR IMPLEMENTING LARGE CAPACITY CALLS BY USING H.323 PROTOCOL STACK

(75) Inventors: Qiang Zhang, Guangdong (CN); Zheng Ma, Guangdong (CN); Feng Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 249 days.

(21) Appl. No.: 13/376,829

(22) PCT Filed: May 7, 2010

(86) PCT No.: PCT/CN2010/072541
§ 371 (c)(1),
(2), (4) Date: Dec. 7, 2011

(87) PCT Pub. No.: WO2010/142179
PCT Pub. Date: Dec. 16, 2010

(65) Prior Publication Data
US 2012/0086770 A1    Apr. 12, 2012

(30) Foreign Application Priority Data
Jun. 8, 2009 (CN) .......................... 2009 1 0147204

(51) Int. Cl.
*H04N 7/15* (2006.01)
(52) U.S. Cl.
USPC ...................... 348/14.09; 370/260
(58) Field of Classification Search
USPC .......... 348/14.09, 14.08, 14.01; 370/260, 261
See application file for complete search history.

(56) References Cited

U.S. PATENT DOCUMENTS 7,940,294 B2 * 5/2011 Wu et al. .................... 348/14.08
8,081,205 B2 * 12/2011 Baird et al. ................ 348/14.08

FOREIGN PATENT DOCUMENTS

| CN | 1492682 A | 4/2004 |
| CN | 1885785 A | 12/2006 |

(Continued)

OTHER PUBLICATIONS

International Search Report dated Aug. 26, 2010 for PCT/CN2010/072541, filed May 7, 2010.

(Continued)

*Primary Examiner* — Stella Woo
(74) *Attorney, Agent, or Firm* — Knobbe, Martens, Olson & Bear, LLP (57) ABSTRACT

A method and system for implementing large capacity calls by using the H.323 protocol stack are provided in the present invention. The method comprises: a plurality of protocol stacks are deployed in a multi-point control unit; an IP address of a third protocol stack is pre-configured as a uniform IP address of the multi-point control unit, wherein the IP address acts as an incoming address when the multi-point control unit is called, and the third protocol stack is used to perform the H.225 signaling interaction with the opposite end when the multi-point control unit is a called party; when the multi-point control unit is a calling party, a first protocol stack, the number of processable calls of which does not exceed a limit number, is selected to perform the H.225 signaling interaction with the opposite end, and a second protocol stack, the number of processable calls of which does not exceed a limit number, is selected to perform the H.245 signaling interaction with the opposite end; when the multi-point control unit is a called party, a fourth protocol stack, the number of processable calls of which does not exceed a limit number, is selected to perform the H.245 signaling interaction with the opposite end. In the present invention, the H.245 messages from different ends are distributed to a plurality of protocol stacks for processing, which thereby improves the processing efficiency.

12 Claims, 5 Drawing Sheets

(56) References Cited

FOREIGN PATENT DOCUMENTS

| CN | 101577734 A | 11/2009 |
|---|---|---|
| WO | WO 2007/097629 A2 | 8/2007 |

OTHER PUBLICATIONS

International Preliminary Report on Patentability and Written Opinion dated Dec. 12, 2011 for PCT/CN2010/072541, filed May 7, 2010.

* cited by examiner

METHOD AND SYSTEM FOR IMPLEMENTING LARGE CAPACITY CALLS BY USING H.323 PROTOCOL STACK

CROSS-REFERENCE TO RELATED APPLICATIONS

This application is the U.S. National Phase application under 35 U.S.C. §371 of International Application PCT/CN2010/072541 filed May 7, 2010, which claims priority to Chinese Application 200910147204.7 filed Jun. 8, 2009.

FIELD OF THE INVENTION

The present invention relates to video conference field, and in particular, to the MCU (multi-point control unit) equipment in the video conference system, method and system for implementing large capacity calls by using H.323 protocol stack.

BACKGROUND OF THE INVENTION

Compared with traditional communication patterns, using video conference system can not only improve the work efficiency, but also free the participants from long traveling, and even it can satisfy the need for dealing with emergencies and multi-party communications and coordination. Therefore, it is a conference pattern of cost-saving, time-saving and high efficiency. With the development of large domestic enterprises and multinational company groups, and with the increase of mobility of people's work and study, the demand of enterprises and individual for video communications is increasing; therefore, the demand for video conference to operation is increasing.

Multipoint control unit, also known as multipoint conference controller, is called MCU. MCU, the function of which is similar to that of a switchboard, is the key equipment of multi-point video conference system. After synchronously separating the information flow from each conference sites, it extracts information and signaling, such as audio, video, data and the like, then sends the information and signaling of respective conference sites to a same processing module to carry out corresponding processes, such as mix and switch of the audio, mix and switch of the video, data broadcasting and routing selection, timing and conference controlling, and the like, and at last, recombines various kinds of information needed by respective conference sites, and then sends them to corresponding terminal equipments and systems.

H.323 is a standard protocol stack of International Telecom Union (ITU). The protocol stack is an organic whole and the protocols in the protocol stack can be classified into four types according to their functions. That is, the protocol stack has made comparatively detailed provisions in various aspects, such as the overall framework of the system (H.323), video codec (H.263), audio codec (H.723.1), system control (H.245), data flow multiplexing (H.225), and the like.

After the video conference comes into operation, currently, the signaling portion is using only one H.323 protocol stack for one MCU, and the signaling interaction processes of H.225 and H.245 in the call process are all carried out by the protocol stack. There is a great amount of signaling which need to be processed by protocol stack in large capacity calls. If the H.225 and H.245 signaling are both processed on one protocol stack, due to the limitation of hardware, problems that the signaling can not be processed timely will occur, which will cause the situations of hung up due to signaling replying overtime and signaling lost, and thus, obviously, the processing efficiency of this method is not high. Therefore, the number of processable calls of one MCU is limited. As the number of users of a video conference operation system increases, the largest number of calls that can be accommodated by one MCU will become a bottleneck.

Thus, the problem of how to implement large capacity calls by using H.323 protocol stack should be taken into consideration by those skilled people.

SUMMARY OF THE INVENTION

The technical problem that the present invention will resolve is to provide a method and system for implementing large capacity calls by using H.323 protocol stack, by means of increasing the call capacity of MCU, thus, the call capacity of the video conference system which is based on the H.323 protocol is increased.

In order to resolve the technical problem mentioned above, the present invention provides a method for implementing the large capacity calls by using H.323 protocol stack, the method comprising:

Deploying a plurality of protocol stacks in a multi-point control unit.

Configuring the largest number of the processable calls of each protocol stack, and pre-configuring an IP address of a third protocol stack as an incoming address when the multi-point control unit is a called party, wherein the third protocol stack is configured to perform the H.225 signaling interaction with an opposite end when the multi-point control unit is the called party.

When the multi-point control unit is a calling party, selecting a first protocol stack, the number of processable calls of which does not exceed said largest number of calls, to perform the H.225 signaling interaction with the called party, and selecting a second protocol stack, the number of processable calls of which does not exceed said largest number of calls, to perform the H.245 signaling interaction with the opposite end.

When the multi-point control unit is a called party, selecting a fourth protocol stack, the number of processable calls of which does not exceed the largest number of calls, to perform the H.245 signaling interaction with the opposite end.

In order to resolve the technical problem mentioned above, the present invention further provides a system which using H.323 protocol stack for implementing the large capacity calls, the system comprising:

Configuring module is configured to deploy a plurality of protocol stacks in a multi-point control unit and configure the largest number of processable calls of each protocol stack, and pre-configure an IP address of the third protocol stack as an incoming address when the multi-point control unit is a called party, and said third protocol stack is configured to perform the H.225 signaling interaction with the opposite end when the multi-point control unit is the called party.

Call control module is configured to, when the multi-point control unit is a calling party, select a first protocol stack, the number of processable calls of which does not exceed said largest number of the processable calls, to perform the H.225 signaling interaction with the opposite end, and select a second protocol stack, the number of processable calls of which does not exceed said largest number of the processable calls, to perform the H.245 signaling interaction with the opposite end; when the multi-point control unit is a called party, select a fourth protocol stack, the number of processable calls of which does not exceed said largest number of the processable calls, to perform the H.245 signaling interaction with the opposite end.

Thus, it is possible to distribute H.245 information from different ends on multi-protocol stacks for processing, therefore, it is possible to greatly improve the efficiency, prohibit the situation that hanging up the call due to overtime of signaling processing or loss of message, and thus increase the call capacity of MCU.

DETAILED DESCRIPTION OF THE EMBODIMENTS

The main idea of the present invention is to deploy a plurality of protocol stacks in a MCU, and to select the protocol stacks according to certain strategies when the MCU acts as a calling party or a called party. Therefore, H.225 signaling and H.245 signaling are processed by different protocol stacks, and the processing efficiency and the call capacity of the MCU are both improved.

It is clear that n protocol stacks are deployed in a MCU, and each of the protocol stacks may only process H.225 signaling or H.245 signaling, or both of them.

Detailed description of the technical scheme of the present invention will be given below with reference to drawings and preferred embodiments.

Figure 1:
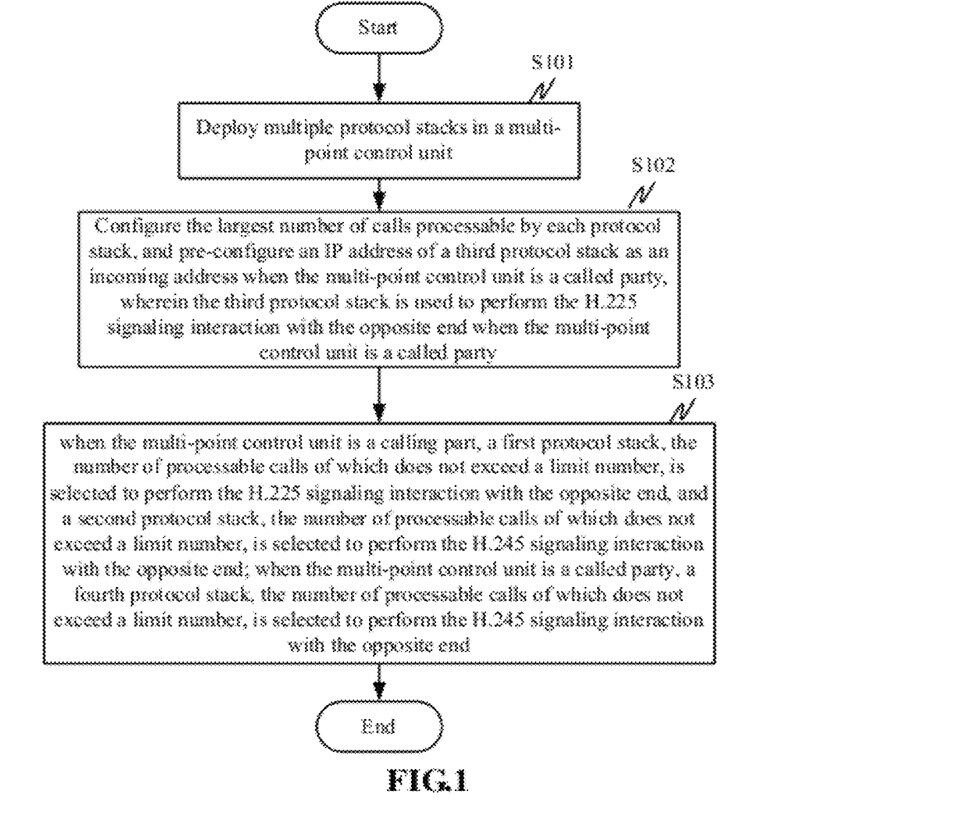
FIG. 1 is a flowchart illustrating the method for implementing large capacity calls by using the H.323 protocol stack according to the embodiment of the present invention.

As illustrated in FIG. 1, which is a flow diagram illustrating the method for implementing large capacity calls by using H.323 protocol stack according to the present invention, the method comprises the following steps:

Step S101: Deploy a plurality of protocol stacks in a multi-point control unit.

Step S102: Configure the largest number of processable calls of each protocol stack as the limit condition for the number of calls processable by the protocol stack, and pre-configure an IP address of a third protocol stack as a uniform IP address of the multi-point control unit, wherein the IP address acts as an incoming address when the multi-point control unit is a called party, and the third protocol stack is used to perform the H.225 signaling interaction with the opposite end when the multi-point control unit is a called party.

Step S103: When the multi-point control unit is a calling party, select a first protocol stack, the number of processable calls of which does not exceed a limit, to perform the H.225 signaling interaction with the opposite end, and select a second protocol stack, the number of processable calls of which does not exceed a limit, to perform the H.245 signaling interaction with the opposite end; and when the multi-point control unit is a called party, a fourth protocol stack, the number of processable calls of which does not exceed a limit number, is selected to perform the H.245 signaling interaction with the opposite end.

When the MCU is a calling party, the first protocol stack, the number of processable calls of which does not exceed the limit, is selected, and the first protocol stack is ordered to initiate a call towards the opposite end, and the first protocol stack performs the H.225 signaling interaction with the opposite end.

After the first protocol stack completed the H.245 signaling interaction with the opposite end, the H.245 address and port number of the opposite end will be reported.

The sign of the first protocol stack having completed the H.225 signaling interaction with the opposite end is that the first protocol stack receives CONNECT signaling sent by the opposite end.

Then, the second protocol stack, the number of processable calls of which does not exceed the limit number, is selected; the H.245 address and port number of the opposite end is transmitted to the second protocol stack; and the second protocol stack is ordered to set up H.245 TCP (Transmission Control Protocol) connection according to the H.245 address and the port number of the opposite end, and the H.245 signaling interaction process is performed.

When the MCU is a called party, the H.225 signaling is monitored and processed by the configured third protocol stack.

After receiving the Setup signaling, the third protocol stack reports that there is a terminal incoming call.

A fourth protocol stack, the processable number of calls of which does not exceed the limit number, is selected; and the H.245 address and the port number of the fourth protocol stack are transmitted to the third protocol stack.

The H.245 address and the port number are assigned to CONNECT signaling and sent to the opposite end by the third protocol stack.

After receiving the CONNECT signaling, the opposite end sets up H.245 TCP connection with the fourth protocol stack according to the received H.245 address and the port number, and the process of the H.245 signaling interaction will be carried out by the fourth protocol stack.

If the selected first protocol stack is the same with the second protocol stack, or the fourth protocol stack is the same with the third protocol stack, it will be the same protocol stack to process calls from a terminal.

Figure 2:
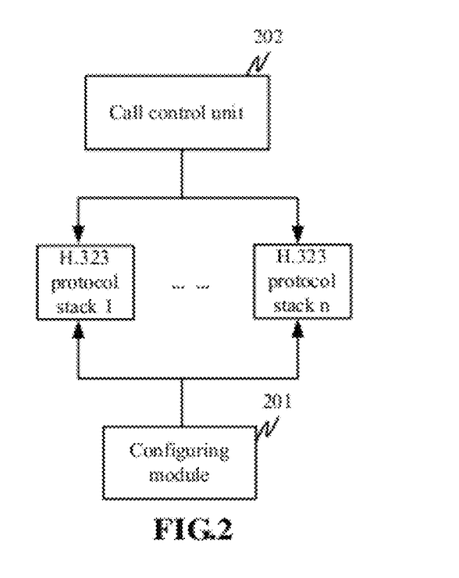
FIG. 2 is a block diagram illustrating the system for implementing large capacity calls by using the H.323 protocol stack according to the embodiment of the present invention.

As illustrated in FIG. 2, it is a block diagram illustrating the system for implementing large capacity calls by using H.323 protocol stacks according to the present invention. The system comprises:

configuring module 201 used to deploy a plurality of protocol stacks in a multi-point control unit, and configure the largest number of processable calls for each protocol stack, and an IP address of a third protocol stack is pre-configured as a uniform IP address of the multi-point control unit, wherein the IP address acts as an incoming address when the multi-point control unit is a called party, and the third protocol stack is used to perform the H.225 signaling interaction with the opposite end when the multi-point control unit is a called party;

call control module 202 used to, when the multi-point control unit is a calling party, select a first protocol stack, the number of processable calls of which does not exceed a limit number, to perform the H.225 signaling interaction with the opposite end, and select a second protocol stack, the number of processable calls of which does not exceed a limit number, to perform the H.245 signaling interaction with the opposite end; and select a fourth protocol stack, the number of processable calls of which does not exceed a limit number, to perform the H.245 signaling interaction with the opposite end when the multi-point control unit is a called party.

Specifically, the functional modules added in the MCU are as following.

1, The largest number of the processable calls for each protocol stack is configured by the configuring module; a third protocol stack is preset to perform the H.225 signaling interaction with the opposite end when the multi-point control unit is a called party; and the address of the third protocol stack acts as a uniform IP address when other terminals calls the MCU.

2, When the MCU is a calling party, the responsibility of the call control module is to select a first protocol stack, the number of processable calls of which does not exceed a limit number, according to certain strategy; and to order the first protocol stack initiating a call towards the opposite end, and the first protocol stack performs the H.225 signaling interaction with the opposite end; after receiving the CONNECT signaling from the opposite end, the first protocol stack reports the H.245 address and the port number of the opposite end to the call control module; the call control module selects a second protocol pack, the number of processable calls of which does not exceed a limit number, according to certain strategy, transfers the H.245 address and port number of the opposite end to the second protocol stack, and orders the second protocol stack to set up H.245 TCP connection with the opposite end, and to performs the H.245 signaling process. When the selected second protocol stack is the same with the first protocol stack, it will be the same protocol stack to process the calls from the terminal.

The strategies for the call control module to select the protocol stacks, the number of processable calls of which does not exceed a limit, may be:

Strategy 1: first, selecting a protocol stack, and when the largest number of processable calls of this protocol stack arrives, selecting a next protocol stack;

Strategy 2: adopting a principle of equal allocation and selecting n protocol stacks equally.

3, When the MCU is a called party, the H.225 signaling is monitored and processed by the third protocol stack preconfigured in 1; after receiving the Setup signaling, the third protocol stack notifies the call control module that there is a terminal incoming call; the call control module selects a fourth protocol stack, the number of processable calls of which does not exceed a limit number, according to the strategies mentioned in 2, and transmits the H.245 address and the port number of the fourth protocol stack to the third protocol stack; the third protocol stack assigns the address and the port number to the CONNECT signaling and then sends the CONNECT signaling to the opposite end; after receiving the CONNECT signaling, the opposite end sets up H.245TCP connection with the fourth protocol stack according to the received H.245 address and the port number, and the H.245 process is implemented by the fourth protocol stack.

When the fourth protocol stack selected by the call control module is the same with the third protocol stack, it will be the same protocol stack to process the calls from the terminal.

A detailed description of the embodiment of the present invention will be given, which embodiment is adopted in the specific applications.

Figure 3:
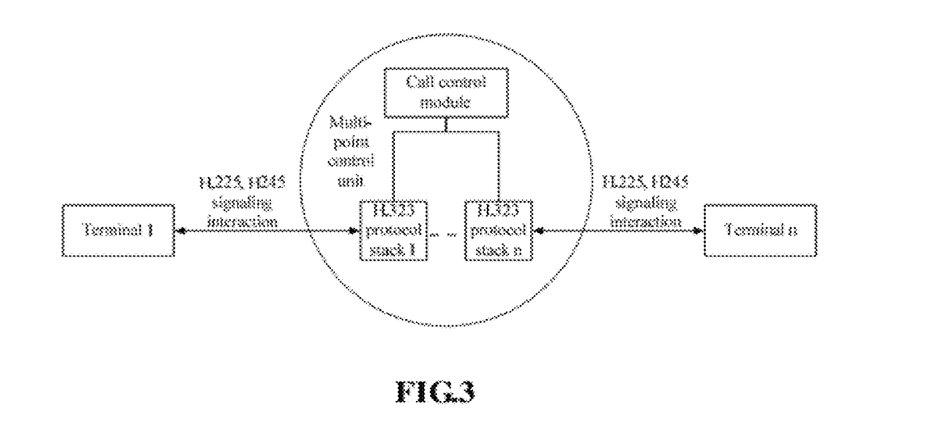
FIG. 3 is a structure diagram illustrating the MCU according to the embodiment of the present invention, in which calls from a terminal are processed by the same protocol stack.

FIG. 3 is the structure diagram illustrating the MCU in which calls from a terminal are processed by a same protocol stack. The MCU in the figure comprises a call control module and n protocol stacks, and the signaling interactions between the terminal and the MCU are performed by the same protocol stack in the call control module. In this case, the first protocol stack, the number of processable calls of which does not exceed a limit number, that has been selected by the call control module is the same with the second protocol stack, or the fourth protocol stack is the same protocol stack with the third protocol stack which was originally processing the H.225 signaling, which is a special case.

Figure 4:
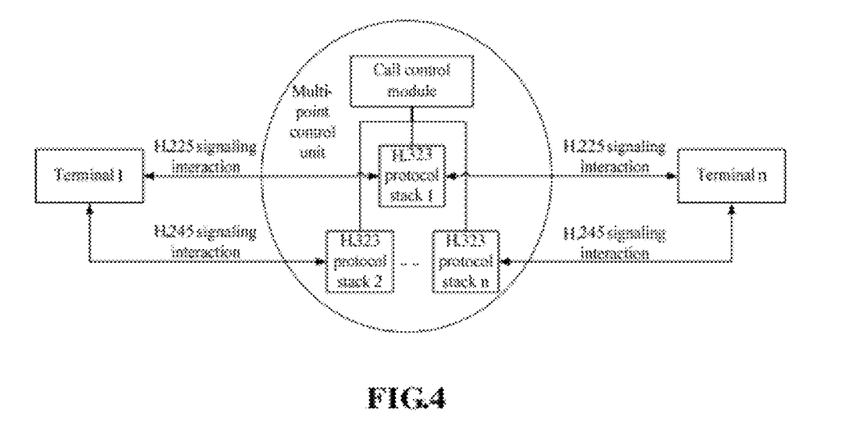
FIG. 4 is a structure diagram illustrating the MCU of the embodiment of the present invention, in which calls from a terminal are processed by a plurality of protocol stacks.

FIG. 4 is the structure diagram illustrating a MCU in which calls from a terminal are processed by a same protocol stack, and the MCU in the figure comprises a call control module and n protocol stacks. The H.225 signaling interactions between the terminal and the MCU are completed by the first protocol stack or the third protocol stack in the call control module (a fixed third protocol stack, which is used for monitoring H.225 signaling, is configured when the MCU is a called party, and when the MCU is a calling party, the call control module selects a first protocol stack, the number of processable calls of which does not exceed a limit number, according to certain strategies to performs the H.225 signaling interaction with the terminal). Afterwards, the H.245 signaling interactions are completed by the second protocol stack or the fourth protocol stack, the second protocol stack and the fourth protocol stack are selected by the call control module, and the number of processable calls for both of them would not exceed a limit number, and the protocol stack for processing the H.245 (e.g. the second protocol stack, the fourth protocol stack) may not be the same protocol stack with the protocol for processing the H.225 (e.g. the first protocol stack, the third protocol stack), and in which FIG. 4, the first protocol stack and the third protocol stack is the same one.

Figure 5:
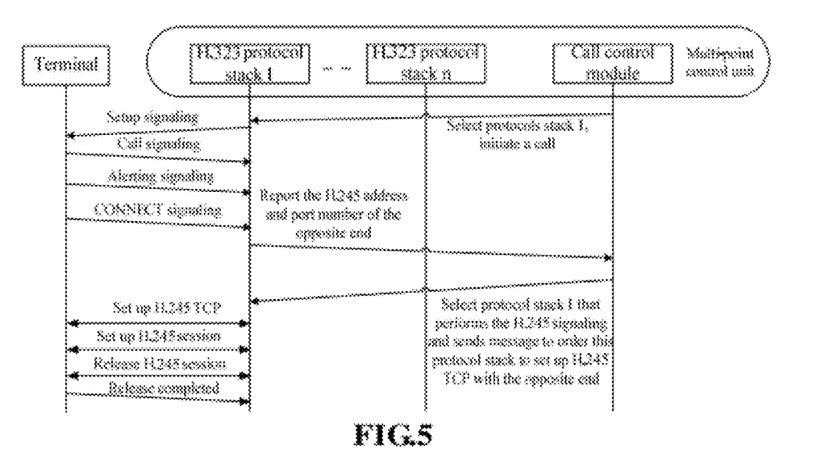
FIG. 5 is a signaling flow diagram illustrating a MCU in which calls from a terminal are processed by only one protocol stack according to the embodiment of the present invention, wherein the MCU is a calling party.

FIG. 5 is a signaling flow diagram illustrating a MCU in which a terminal call is only processed by one protocol stack, and the MCU is a calling party, which includes n protocol stacks.

The processing of the flow comprises the steps of:

Step 1: a H.323 protocol stack 1, the number of processable calls of which does not exceed a limit number, is selected according to certain strategies by the call control module, and the call control module orders the H.232 protocol stack 1 to initiate a call towards a terminal;

Step 2: the H323 protocol stack 1 sends Setup signaling to the terminal, and the terminal replies to the H.323 protocol stack with Call Proceeding signaling, Alerting signaling, and CONNECT signaling;

Step 3: after receiving the CONNECT signaling, the H.323 protocol stack 1 reports the H.245 address and the port number of the opposite end to the call control module; and Step 4: the call control module selects a protocol stack (the selected protocol stack is the H.323 protocol stack 1 in the present embodiment), the number of processable calls of which does not exceed a limit number, according to certain strategies, sends the H.245 address and the port number of the opposite end to the protocol stack, and orders the protocol stack to set up H.245 TCP connection with the terminal and to set up and release an H.245 session.

Figure 6:
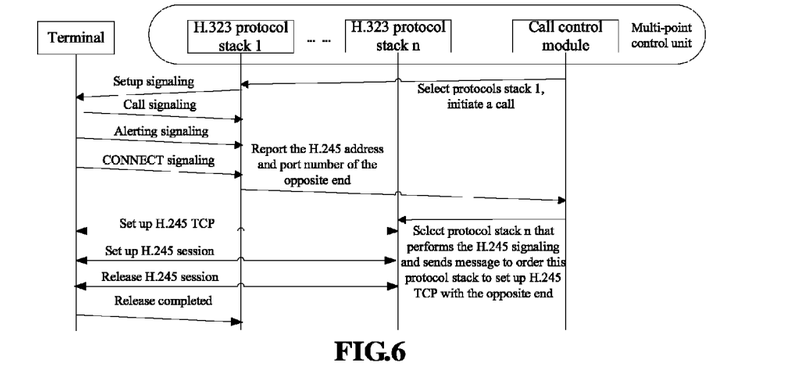
FIG. 6 is a signaling flow diagram illustrating a MCU in which calls from a terminal are processed by a plurality of protocol stacks according to the embodiment of the present invention, wherein the MCU is a calling party.

FIG. 6 is a signaling flow diagram illustrating a MCU in which a terminal call is processed by a plurality of protocol stacks, and the MCU act as a calling party, in which FIG. 6 the MCU includes n protocol stacks.

The flow of processing portion includes the steps of:

Step 1: a H.323 protocol stack 1, the number of processable calls of which does not exceed a limit number, is selected according to certain strategies by the call control module, and the call control module orders the H.323 protocol stack 1 to initiate a call towards a terminal;

Step 2: the H323 protocol stack 1 sends Setup signaling to the terminal, and the terminal replies to the H.323 protocol stack with Call Proceeding signaling, Alerting signaling, and CONNECT signaling;

Step 3: after receiving the CONNECT signaling, the H.323 protocol stack 1 reports the H.245 address and the port number of the opposite end to the call control module; and Step 4: the call control module selects a protocol stack n, the number of processable calls of which does not exceed a limit number, according to certain strategies, and sends the H.245 address and the port number of the opposite end to the protocol stack, and orders the protocol stack to set up H.245 TCP connection with the terminal and to set up and release an H.245 session.

Figure 7:
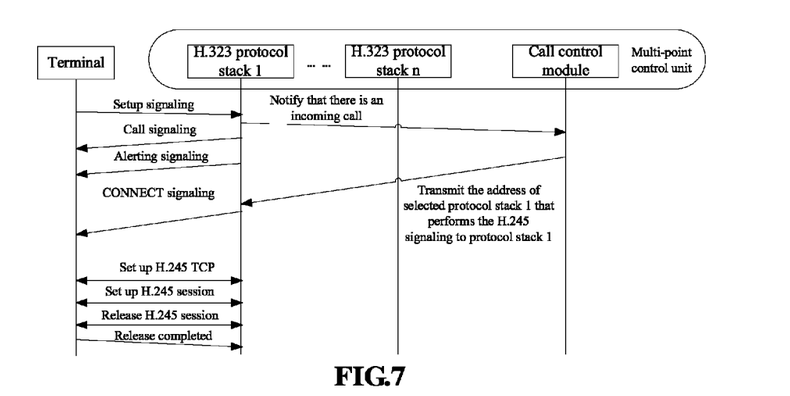
FIG. 7 is a signaling flow diagram illustrating a MCU in which calls from a terminal are processed by only one protocol stack according to the embodiment of the present invention, wherein the MCU is a called party.

FIG. 7 is a signaling flow diagram illustrating a MCU in which a terminal call is only processed by one protocol stack, in which FIG. 7, the MCU act as a called party, and the MCU includes n protocol stacks, and a H.323 protocol stack is configured by a configuring module to monitor H.225 signaling, and to process all the H.225 signaling of the incoming calls.

The flow of the processing portion includes the steps of:

Step 1, a terminal sends Setup signaling to a H.323 protocol stack 1, and after receiving the Setup signaling, the H.323 protocol stack 1 notify the call control module that there is an incoming call;

Step 2, the call control module selects a protocol stack (that is, H.323 protocol stack 1), the number of processable calls of which does not exceed a limit number, according to certain strategies, and sends the H.245 address and the port number of the selected protocol stack to the H.323 protocol stack 1;

Step 3, the address and the port number are assigned to CONNECT signaling and sent to the opposite end by the H.323 protocol stack 1;

Step 4, after receiving the CONNECT signaling, the opposite end sets up H.245 TCP connection with the H.323 protocol stack 1, establishes and releases H.245 sessions according to the received H.245 address and the port number.

Figure 8:
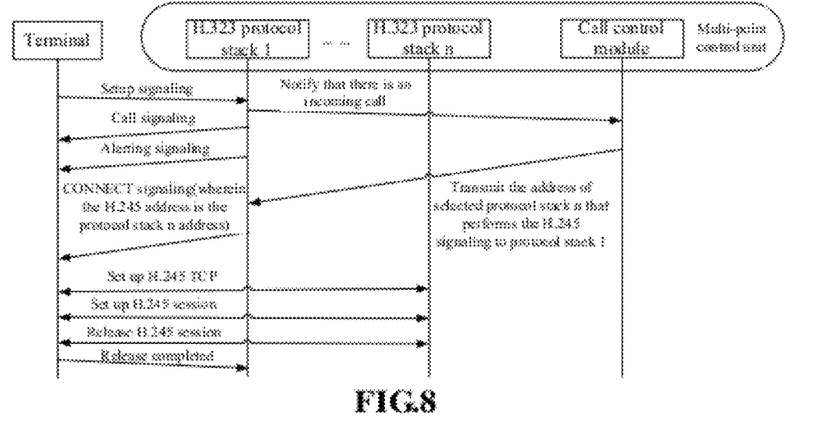
FIG. 8 is a signaling flow diagram illustrating a MCU in which calls from a terminal are processed by a plurality of protocol stacks according to the embodiment of the present invention, wherein the MCU is a called party.

FIG. 8 is a signaling flow diagram illustrating a MCU in which a terminal call is processed by a plurality of protocol stacks, in which FIG. 8, the MCU acts as a called party, and the MCU includes n protocol stacks, and H.323 protocol stack 1 is configured by the configuring module to monitor H.225 signaling, and to process all H.225 signaling of the incoming calls.

The processing of the flow comprises the steps of:

Step 1: a terminal sends Setup signaling to a H.323 protocol stack 1, and after receiving the Setup signaling, the H.323 protocol stack 1 notifies a call control module that there is an incoming call;

Step 2: the call control module selects a H.323 protocol stack n, the number of processable calls of which does not exceed a limit number, according to certain strategies, and sends the H.245 address and the port number of the selected protocol stack to the H.323 protocol stack 1;

Step 3: the address and the port number are assigned to CONNECT signaling and sent to the opposite end by the H.323 protocol stack 1; and Step 4: after receiving the CONNECT signaling, the opposite end sets up H.245 TCP connection with the H.323 protocol stack n, establishes and release H.245 session according to the received the H.245 address and the port number.

It should be noted that what have been mentioned above is just the preferred embodiment, instead of the limitations of the scope of the present invention, those variations and modifications or the equivalents shall be within the scope of appended claims of the present invention.

What is claimed is:

1. A method for implementing calls by using H.323 protocol stacks, comprising:
   deploying a plurality of protocol stacks in a multi-point control unit;
   configuring a maximum number of processable calls of each protocol stack, and pre-configuring an IP address of a third protocol stack as an incoming address when the multi-point control unit is a called party, wherein the third protocol stack is configured to perform the H.225 signaling interaction with an opposite end when the multi-point control unit is the called party;
   when the multi-point control unit is a calling party, selecting a first protocol stack, the number of procesable calls of which does not exceed said maximum number of calls, to perform the H.225 signaling interaction with a called party, and selecting a second protocol stack, the number of processable calls of which does not exceed said largest number of calls, to perform the H.245 signaling interaction with the opposite end; and
   when the multi-point control unit is a called party, selecting a fourth protocol stack, the number of processable calls of which does not exceed the maximum number of calls, to perform the H.245 signaling interaction with the opposite end.

2. The method of claim 1, wherein when the multi-point control unit is a calling party, the step of performing H.225 and H.245 signaling interaction with the opposite end comprises:
   ordering the first protocol stack to initiate a call towards the opposite end, and the first protocol stack performing the H.225 signaling interaction with the opposite end;
   said first protocol stack receives the H.245 address and the port number of the opposite end through said H.225 signaling; and
   transmitting the H.245 address and the port number of the opposite number to the second protocol stack, and ordering the second protocol stack to set up transmission control protocol connection with the opposite end according to the H.245 address and port number of the opposite end, and perform H.245 signaling interaction process.

3. The method of claim 1, wherein when the multi-point control unit is a called party, the step of performing H.225 and H.245 signaling interaction with the opposite end comprises:
   monitoring the H.225 signaling by the pre-configured third protocol stack, and after receiving the Setup signaling based on said H.225, the third protocol stack reporting that there is a terminal incoming call; and
   transmitting the H.245 address and port number of the fourth protocol stack to the third protocol stack; the third protocol stack sending said address and port number to the opposite end; the opposite end setting up H.245 transmission control protocol connection with the fourth protocol stack according to the received H.245 address and the port number, the H.245 signaling interaction process being performed by the fourth protocol stack.

4. The method of claim 1, wherein said first protocol stack is the same or not the same protocol stack with said second protocol stack; said third protocol stack is the same or not the same protocol stack with said fourth protocol stack.

5. The method of claim 1, wherein the steps of selecting the first protocol stack, the second protocol stack and the fourth protocol stack comprises: in each of the process of the call processing, one protocol stack being firstly selected, and when the selected protocol stack reaches the maximum number of processable calls, selecting a next protocol stack.

6. The method of claim 1, wherein the steps of selecting the first protocol stack, the second protocol stack and the fourth protocol stack comprises: in each of the process of the call processing, each protocol stack being selected in turn, until all the protocol stacks reaching the limitation of the maximum number of processable calls.

7. A system for implementing calls by using H.323 protocol stacks, comprising:
configuring module, configured to deploy a plurality of protocol stacks in a multi-point control unit and configure a maximum number of proces sable calls of each protocol stack, and pre-configure an IP address of the third protocol stack as an incoming address when the multi-point control unit is a called party, and said third protocol stack is configured to perform the H.225 signaling interaction with the opposite end when the multi-point control unit is the called party;
call control module, configured to, when the multi-point control unit is a calling party, select a first protocol stack, the number of processable calls of which does not exceed said maximum number of processable calls, to perform the H.225 signaling interaction with the opposite end, and select a second protocol stack, the number of processable calls of which does not exceed said maximum number of processable calls, to perform the H.245 signaling interaction with the opposite end; when the multi-point control unit is a called party, select a fourth protocol stack, the number of processable calls of which does not exceed said maximum number of processable calls, to perform the H.245 signaling interaction with the opposite end.

8. The system of claim 7, wherein when the multi-point control unit is the calling party, performing H.225 and H.245 signaling interaction with the opposite end comprises:
the call control module is configured to order the first protocol stack to initiate a call towards the opposite end, the first protocol stack performing the H.225 signaling interaction with the opposite end;
the first protocol stack is configured to receive the H.245 address and port number of the opposite end through said H.225 signaling; and report the H.245 address and port number of the opposite end to said call control module;
the call control module is configured to transmit the H.245 address and the port number of the opposite end to the second protocol stack, and order the second protocol stack to set up transmission control protocol connection with the opposite end according to the H.245 address and port number of the opposite end, and perform H.245 signaling interaction process.

9. The method of claim 7, wherein when the multi-point control unit is a called party, performing H.225 and H245 signaling interaction with the opposite end comprises:
the call control module is configured to control said third protocol stack to monitor and process the H.225 signaling, and after receiving Setup signaling, the third protocol stack report the information that there is a terminal incoming call to said call control module;
the call control module is configured to transmit the H.245 address and port number of the fourth protocol stack to the third protocol stack; the third protocol stack sends said address and port number to the opposite end; the opposite end sets up H.245 transmission control protocol connection with the fourth protocol stack according to the received H.245 address and the port number, the H.245 process is performed by the fourth protocol stack.

10. The system of claim 7, wherein said first protocol stack is the same or not the same protocol stack with said second protocol stack; said third protocol stack is the same or not the same protocol stack with said fourth protocol stack.

11. The system of claim 7, wherein said call control module is also configured to select one protocol stack in the process of each call processing, and when the selected protocol stack reaches the maximum number of processable calls, select a next protocol stack.

12. The method of claim 7, wherein said call control module is also configured to select each protocol stack successively in each of the process of the call processing, until all the protocol stacks reach the limitation of the maximum number of processable calls.

* * * * *

UNITED STATES PATENT AND TRADEMARK OFFICE
CERTIFICATE OF CORRECTION

PATENT NO.        : 8,760,491 B2                                        Page 1 of 1
APPLICATION NO.   : 13/376829
DATED             : June 24, 2014
INVENTOR(S)       : Qiang Zhang It is certified that error appears in the above-identified patent and that said Letters Patent is hereby corrected as shown below:

In the Specification

Column 5 line 18, Change "1," to --1.--.

Column 5 line 25, Change "2," to --2.--.

Column 5 line 52, Change "3," to --3.--.

Column 5 line 64, Change "H.245TCP" to --H.245 TCP--.

Column 6 line 51, Change "H.232" to --H.323--.

Column 6 line 53, Change "H323" to --H.323--.

Column 7 line 11, Change "H323" to --H.323--.

In the Claims

Column 8 line 26, Claim 1, change "proces sable" to --processable--.

Column 9 line 24, Claim 7, change "proces sable" to --processable--.

Column 10 line 16, Claim 9, change "The method of claim 7" to --The system of claim 7--.

Column 10 line 17, Claim 9, change "H245" to --H.245--.

Column 10 line 41, Claim 12, change "The method of claim 7" to --The system of claim 7--.

Signed and Sealed this
Seventeenth Day of February, 2015

Michelle K. Lee
*Deputy Director of the United States Patent and Trademark Office*